United States Patent [19]

Eich et al.

[11] 3,911,788

[45] Oct. 14, 1975

[54] MILLING MACHINE FOR MILLING CRANKWEBS AND CRANKPINS

[75] Inventors: Edmund Eich; Anton von den Hoff; Rolf Dieter Neuser, all of Coburg, Germany

[73] Assignee: Werkzeugmaschinenfabrik Adolf Waldrich Coburg, Coburg, Germany

[22] Filed: July 13, 1973

[21] Appl. No.: 378,957

[30] Foreign Application Priority Data
Aug. 1, 1972   Germany............................ 2237795

[52] U.S. Cl. .............................. 90/20; 90/14; 90/19
[51] Int. Cl.² ......................................... B23C 1/14
[58] Field of Search .................... 90/14, 20; 82/9

[56] References Cited
UNITED STATES PATENTS
1,687,350   10/1928   Rollings .................................. 90/20
FOREIGN PATENTS OR APPLICATIONS
1,184,599   12/1964   Germany ................................ 90/20

Primary Examiner—Robert L. Spruill
Assistant Examiner—W. R. Briggs
Attorney, Agent, or Firm—Woodhams, Blanchard and Flynn

[57] ABSTRACT

Milling machine especially for milling crankwebs and crankpins. There is provided a rotatable clamping plate for clamping the workpiece in working position and also provided a milling wheel rotatable about an axis of rotation parallel to the axis of rotation of the clamping plates. In a preferred embodiment, the milling wheel is mounted in a stationary frame for rotation about a vertical axis and is movable during such rotation axially therealong. The clamping plate is in this embodiment likewise arranged for rotation about a perpendicular axis and same is mounted on a table which is movable relative to the milling wheel axis toward and away therefrom along the line perpendicular to both thereof.

3 Claims, 5 Drawing Figures

MILLING MACHINE FOR MILLING CRANKWEBS AND CRANKPINS

FIELD OF THE INVENTION

This invention relates to a milling machine for milling crankwebs and crankpins, having a rotatable clamping plate and a milling wheel rotating about an axis of rotation parallel to the axis of rotation of the clamping plate and equipped with exchangeable cutters, the two axes of rotation being movable at right angles relative to one another.

BACKGROUND OF THE INVENTION

Known crankshaft milling machines (see German Published Patent Specification No. 1 300 419) serve for milling crankshafts for small and medium-sized engines which are forged as a rule in one piece. This means that the crankshaft itself consists of a plurality of concentrically arranged bearings and eccentrically arranged crankpins which are interconnected via crankwebs. In the crankshaft milling machines heretofore known, the two bearings or journals provided at the ends of the crankshaft are accommodated in chucks which are rotatable in synchronism. Mounted slidably on a machine bed on guideways arranged parallel to the axis of rotation of the chucks is a rest consisting of a saddle or lower slide slidable on the guideways and a tool or upper slide slidable on the saddle at right angles to the axis of rotation of the chucks and at right angles to the guideways. The tool slide, in turn, carries a milling wheel rotating about an axis arranged parallel to the axis of the chucks and carrying cutters in exchangeable holders at its periphery. Not only the crankpins, but also the lateral faces of the crankwebs are machined with this milling wheel. In this process, the milling wheel and the tool slide must be moved forward and back at right angles to the axis of rotation of the crankshaft in accordance with the eccentric movement of the crankpin, the crankshaft being rotated at the same time. The crankshaft milling machines heretofore known are not suitable for rather large throws, since one-sided clamping on a clamping plate rotatable about a horizontal axis entails considerable design problems because of the great weight of the workpiece, by which problems the cost of the machine would also be considerably increased. Moreover, it would be possible to align and clamp the very heavy workpiece on this clamping plate only with the greatest difficulty. The risk of accident during this operation would be considerable.

Crankshafts for large engines consist of several parts, two crankwebs and the crankpin disposed therebetween forming a unit in each case. This unit is called a "throw". Such throws are machined on turret lathes the clamping plate of which rotates, as is known, about a vertical axis. A tool slide is arranged to be movable vertically and horizontally on a vertical pillar, this tool slide jutting out a considerable distance, carrying the cutting tool at its free end and extending between the crankwebs. Since this tool slide has a low rigidity because of the great extent to which it projects, a supporting device must also be provided behind the slide in the direction of rotation of the clamping plate. The rotary machining of these throws is time-consuming, however, since during the machining of the crankwebs the cutting tool is in use in any given instance only over a comparatively small angular range of a complete revolution of the clamping plate.

The problem underlying the invention is to provide a milling machine which, while having a simple design, makes the machining of crankshaft throws of medium-sized and large engines possible in a time-saving manner.

According to the invention, this is achieved in that the milling wheel is mounted in a stationery frame to be rotatable about a vertical axis and slidable along its axis of rotation, and the clamping plate is arranged to be rotatable about a vertical axis on a table slidable horizontally at right angles to the axis of the milling wheel.

In comparison with rotation of the crankshaft, this construction makes possible substantially faster machining operation. The new milling machine enables the main advantage of milling to be utilized, namely the high cutting capacity, even in the case of large throws. Since the crankpin is clamped concentrically on the clamping plate, the axis of rotation of the clamping plate and the axis of rotation of the milling wheel can remain at the same distance during the milling of the crankpin, as a result of which, on the one hand, control of the machine is simplified and, on the other hand, less wear can also be expected. Moreover, the clamping of the heavy throw is particularly simple with this new milling machine. Since the clamping plate is mounted on a slidable table, this table can be moved into a position in which the clamping plate is not covered overhead by any other machine parts of any kind. In consequence, the throw can be set down on the clamping plate and lifted away when the work has been completed by means of a crane without any risk of damaging the machine.

Similarly, simple mounting and removal of the relatively heavy and bulky milling wheel can be made possible in that the milling wheel is mounted overhung and the frame is arranged below the milling wheel with the bearings.

Advantageously, moreover, a second milling assembly may be provided on a vertical pillar beside the table at a table station at a distance from the milling wheel. This second milling assembly serves to machine the crankwebs externally. Due to the arrangement of the second milling assembly, practically speaking "all-round machining" of the throws can be carried out on one and the same milling machine.

BRIEF DESCRIPTION OF THE DRAWINGS

Illustrative embodiments are described hereinafter in detail with reference to the drawings.

In the drawings.

DETAILED DESCRIPTION

Figure 1:
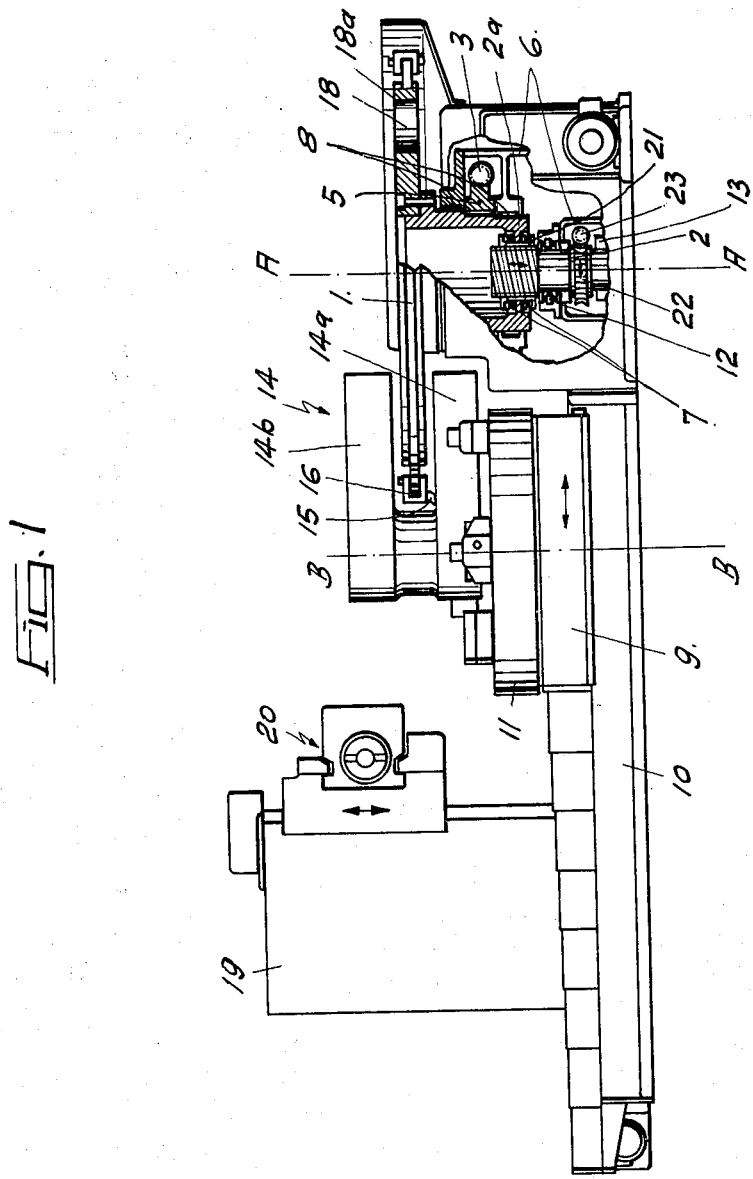
FIG. 1 is a side view of the new milling machine.

In the drawings, the reference 1 designates the milling wheel, which is mounted to be rotatable about a vertical axis A—A. In the embodiment shown, the hollow milling wheel shaft 2a is driven by a worm gear having two worms 3 and 4 offset by 90° and meshing with a worm wheel 5 connected to the milling wheel shaft 2a so that it is rotationally fast therewith, but axially slidable with respect thereto. These two worms 3, 4 are advantageously so braced hydraulically or in some other manner in relation to one another that only one of the two worms has a driving action by bearing against one set of tooth flanks of the worm wheel 5, while the other worm bears against the oppositely directed tooth flanks of the worm wheel 5. In this way, vibrations of the milling wheel in the peripheral direction are obviated. Instead of the worm gear, it would also be possible if necessary to provide a spur gear with two mutually braced driving pinions.

A stationary frame serves for mounting the milling wheel 1 and the milling wheel is supported therein by means of the hydrostatic bearing 8. The lower end of the milling wheel shaft 2a is supported by means of the axial bearing 7 on a nut 21 which co-operates with the adjusting spindle 2. The adjusting spindle 2 is mounted rotatably but immovable axially in the frame 6. A worm gear 22, 23 is used for the drive of the adjusting spindle.

A table 9 is mounted on the bed 10 to be slidable in the horizontal direction at right angles to the axis A—A of the milling wheel. This table 9 carries the clamping plate 11, which is rotatable about the perpendicular axis B—B. The rotation is produced by means of a rotating drive arranged in the table 9 but not shown in the drawing.

Figure 2:
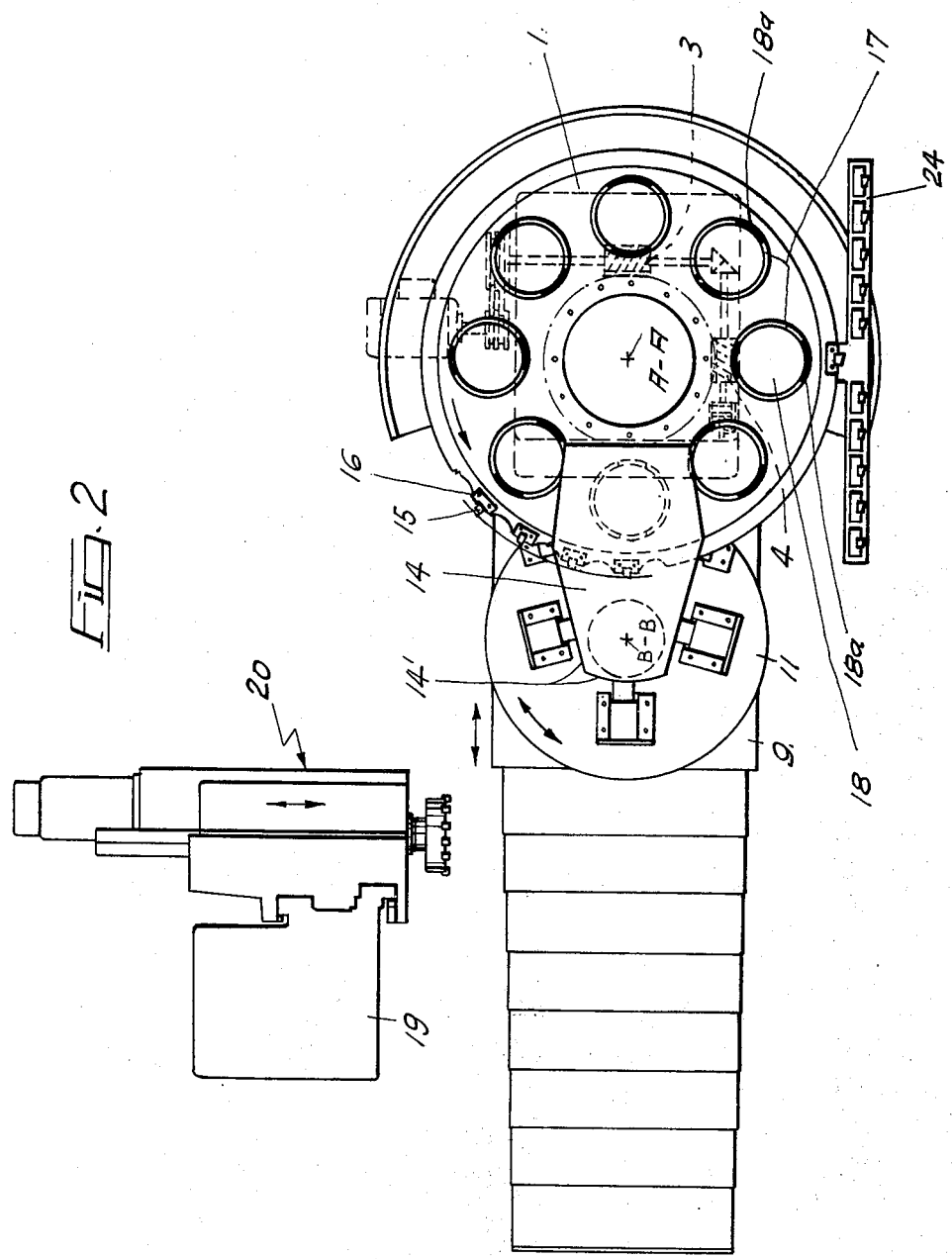
FIG. 2 is a plan view.

As is the case with the embodiment shown, the milling wheel 1 is advantageously mounted overhung and the frame 6 is arranged with the bearings 8, 12, 13 below the milling wheel 1. In this way, the relatively large and heavy milling wheel can easily be mounted and removed by means of a crane. The same applies to the workpiece, namely the throw 14, which, after the table 9 has been moved to the left out of the working position shown in FIGS. 1 and 2, can be lifted off freely upwardly.

To enable the individual cutters 15 to be exchanged rapidly, they are secured at the periphery of the milling wheel 1 in manner known per se by means of so-called quick-change holders 16. A storage and changing arrangement 24 may be provided to facilitate and speed up the removal and insertion of the holders 16.

For reasons of weight saving, the milling wheel 1 will be provided with openings 17. Auxiliary-mass dampers may be arranged in these openings to prevent vibration of the milling wheel in and at right angles to its plane. The auxiliary-mass dampers 18 may be formed by discs which are inserted in the openings 17 with a gap between and held by elastic elements 18a of rubber or plastic. The auxiliary-mass dampers prevent or reduce not only vibration at right angles to the plane of the milling wheel, but also in this plane itself. Moreover, a second, smaller milling assembly 20 of conventional type is advantageously provided on a vertical pillar 19 beside the table 9 at a table station at a distance from the milling wheel 1. This milling assembly serves to machine the throw externally at the outer faces designated by the reference 14'. The throw can consequently be machined after a single clamping operation and reclamping on another machine is dispensed with.

The sequence of removal of metal by cutting may take place in various ways:

The throw 14 clamped on the clamping plate 11 may first be moved up to the milling wheel 1 by shifting the table 9 until the desired depth has been reached and the inside of the lower crankweb 14a can then be machined by rotation of the clamping plate. Thereafter, when the milling wheel 1 has been shifted axially upwards, the inside of the upper crankweb 14b can be machined and finally also the crankpin 14c.

It is also possible, however, to move the throw towards the milling wheel in various fixed angular positions and in so doing machine the crankwebs at their insides along radial paths. Following this, the crankpin is then machined by rotating the clamping plate.

The milling wheel may be fitted with cutters on one side, as shown in the drawing. In this case, only a comparatively low driving power is required. The milling wheel may also be so equipped, however, that it finish mills the insides of the crankwebs 14a and 14b simultaneously and then the crankpin in a full cut. The necessary driving power for this purpose, however, is substantially greater and, because of the higher cutting forces, not only is tighter clamping on the clamping plate necessary, but also a sturdier construction of all the bearing parts.

Figure 3:
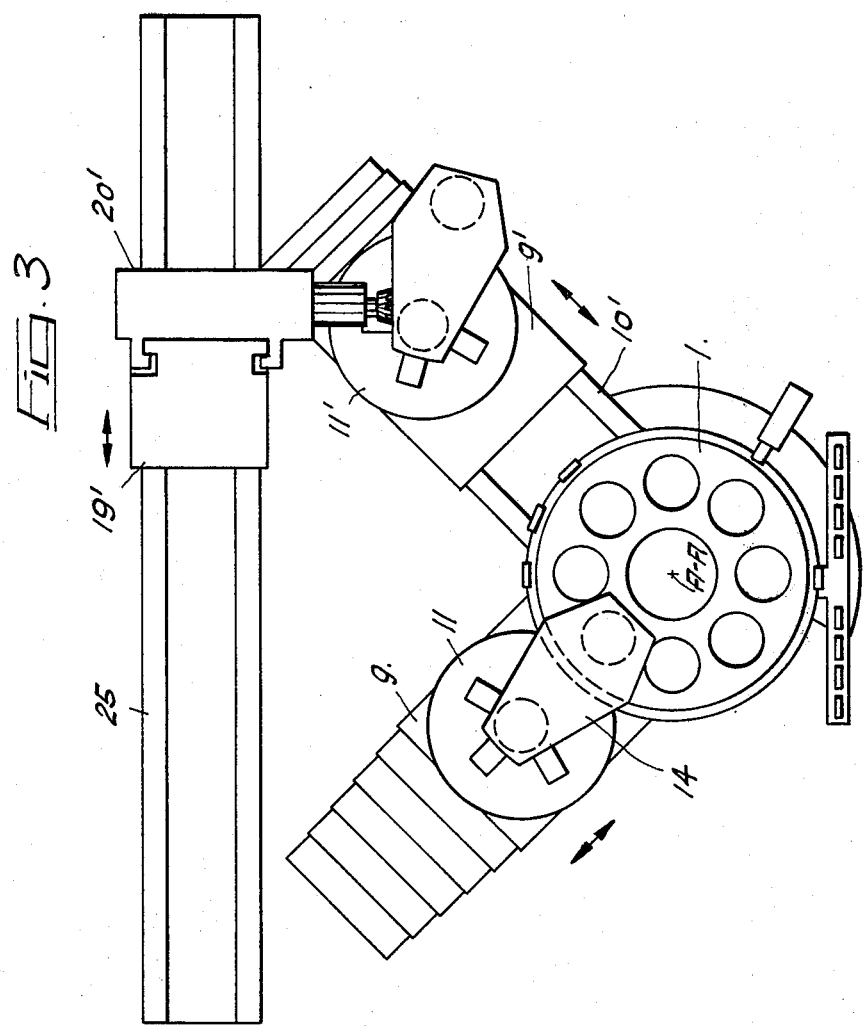
FIG. 3 is a plan view of a second embodiment.
Figure 4:
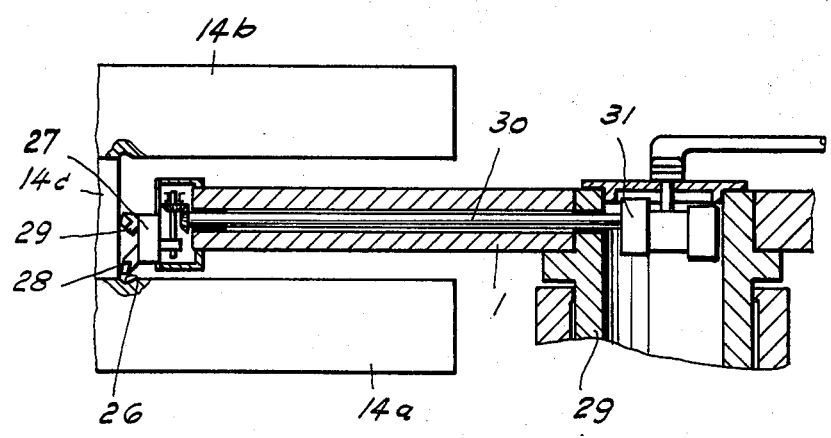
FIGS. 4 and 5 are partial sections through two different constructional forms of a milling wheel.

FIG. 3 shows a second constructional form of the milling machine according to the invention which permits still better utilization thereof. In this constructional form, in addition to the parts of the machine which have already been described, a second table 9' with a second clamping plate 11' is mounted to be slidable at right angles to the axis A—A of the milling wheel on a second bed 10' arranged at right angles to the first bed 10. The second milling assembly 20' is mounted to be slidable vertically on the vertical pillar 19', the latter being arranged slidably on a bed 25 extending between the end positions of the two tables 9, 9'. While the large milling wheel 1 is carrying out the internal machining of the throw 14, the table 9' is in its rear position in which the milling assembly 20' executes the external machining of a second throw. When the internal machining of the first throw has been completed, the table 9 travels into its rear position and the milling assembly 20' is shifted to the left to machine this throw externally. In the meantime, another throw can be mounted on the clamping plate 11' and then be machined by the milling wheel 1.

In order also to be able to carry out turning machining operations on the new milling machine, for example the cutting of an annular groove 26 which is necessary at the transition between the crankpin 14c and the crankwebs 14a, 14b, it is advantageous to provide on the milling wheel 1 a tool side 27 movable in the axial direction of the milling wheel and serving to hold one or more turning tools 28, 29. The shifting of the tool slide in the axial direction is effected by way of a radially arranged connecting shaft 30 which is driven by a geared motor 31 arranged in the hollow milling wheel shaft 2a. By rotating the clamping plate, the groove 26 can then be cut by means of the turning tool 28 and finish machining of the crank-pin 14c can be carried out by means of the turning tool 29.

Figure 5:
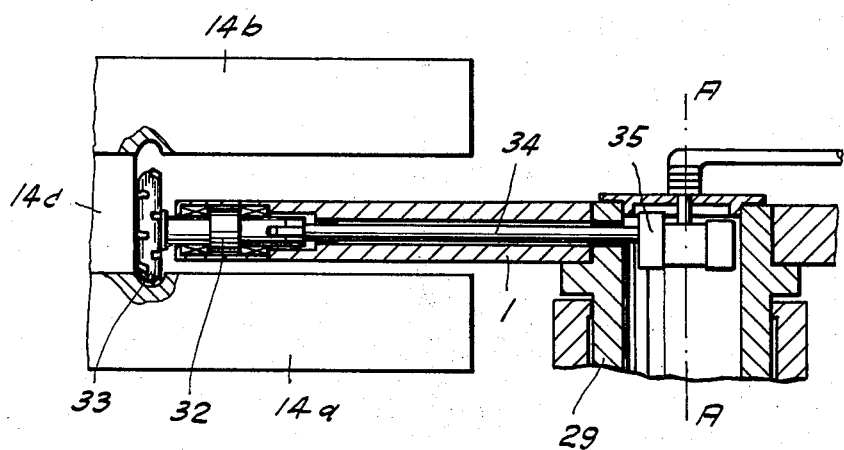

FIG. 5 shows an alternative arrangement for producing the annular groove 26. Mounted in the vicinity of the periphery of the milling wheel 1 is a milling spindle 32 the axis of which extends radially. This milling spindle carries a side-milling cutter 33 at its outer end. The drive is carried out by way of a connecting shaft 34 from the motor 35 arranged in the hollow milling wheel shaft 2a. By shifting the milling wheel 1 in the axial direction, the side-milling cutter 33 is fed to the correct milling depth.

The embodiments of the invention in which an exclusive property or privilege is claimed are defined as follows:

1. In a milling machine having a frame and a rotatable workpiece support rotatably supported on said frame by first support means for movement about a first vertical axis and a rotatable milling wheel rotatably supported on said frame by second support means for movement about a second vertical axis parallel to said first vertical axis, drive means for said milling wheel, said milling wheel having a plurality of cutter means thereon and transport means for effecting a relative movement between said first and second support means and, consequently, said first and second vertical axes toward and away from each other, the improvement comprising wherein said first and second support means on said frame are located below the axially central plane of said milling wheel, said plane being perpendicular to said vertical axes, said milling wheel having a shaft which is rotatably supported on a nut, said nut being vertically adjustable by means of an adjusting spindle mounted for rotation but axially immovable in said frame, said milling wheel having a sufficient diameter to extend radially outwardly beyond the radial extent of said second support means to overlap said workpiece support when said first and second axes are spaced toward each other, said workpiece support and said milling wheel being completely free from machine support structure vertically thereabove when said first and second axes are spaced away from each other to facilitate the use of an overhead lifting device to assist in (1) the removal or placement of workpieces on said workpiece support and (2) the removal or placement of another milling wheel on said second support means.

2. The improved milling machine according to claim 1, wherein said drive means includes two mutually braced gears which are provided for driving said milling wheel for rotation.

3. The improved milling machine according to claim 1, wherein said milling wheel has openings in which auxiliary-mass dampers are arranged.

* * * * *